(12) United States Patent
Matsushita

(10) Patent No.: US 10,971,731 B2
(45) Date of Patent: Apr. 6, 2021

(54) ELECTRODE CURRENT COLLECTOR INCLUDING ALUMINUM OXIDE LAYER HAVING ALUMINUM-FLUORIDE BOND, ALL SOLID STATE BATTERY, AND METHOD FOR PRODUCING

(71) Applicant: TOYOTA JIDOSHA KABUSHIKI KAISHA, Toyota (JP)

(72) Inventor: Yuki Matsushita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 16/210,359

(22) Filed: Dec. 5, 2018

(65) Prior Publication Data

US 2019/0198880 A1    Jun. 27, 2019

(30) Foreign Application Priority Data

Dec. 27, 2017  (JP) .............................. JP2017-251263

(51) Int. Cl.
| | | |
|---|---|---|
| *H01M 4/66* | (2006.01) | |
| *H01M 10/42* | (2006.01) | |
| *H01M 4/04* | (2006.01) | |
| *H01M 10/0525* | (2010.01) | |
| *H01M 10/0562* | (2010.01) | |

(52) U.S. Cl.
CPC .......... *H01M 4/661* (2013.01); *H01M 4/0404* (2013.01); *H01M 4/0471* (2013.01); *H01M 4/667* (2013.01); *H01M 4/668* (2013.01); *H01M 10/0525* (2013.01); *H01M 10/0562* (2013.01); *H01M 10/4235* (2013.01)

(58) Field of Classification Search
CPC .. H01M 4/661; H01M 4/0404; H01M 4/0471; H01M 4/667; H01M 4/668; H01M 10/0525; H01M 10/0562
USPC ................................... 429/233, 245
See application file for complete search history.

(56) References Cited

U.S. PATENT DOCUMENTS

| | | | |
|---|---|---|---|
| 2008/0318130 A1* | 12/2008 | Ogawa ................. | H01M 4/1391 429/231.95 |
| 2015/0303484 A1* | 10/2015 | Iida ....................... | H01M 4/668 429/233 |
| 2017/0047579 A1* | 2/2017 | Suehiro ................ | H01M 4/131 |
| 2017/0207440 A1 | 7/2017 | Hama et al. | |
| 2017/0352866 A1* | 12/2017 | Kawai ................... | H01M 4/131 |
| 2017/0358816 A1 | 12/2017 | Sugiura | |

(Continued)

FOREIGN PATENT DOCUMENTS

| | | | |
|---|---|---|---|
| JP | 2017-130283 A | | 7/2017 |
| JP | 2017183256 A | * | 10/2017 |
| JP | 2017201589 A | * | 11/2017 |

(Continued)

*Primary Examiner* — Sean P Cullen
(74) *Attorney, Agent, or Firm* — Oliff PLC

(57) ABSTRACT

A main object of the present disclosure is to provide an electrode current collector in which the peel-off of a coating layer and an aluminum oxide layer is inhibited. The present disclosure achieves the object by providing an electrode current collector to be used in an all solid state battery, the electrode current collector comprising: a current collecting layer, an aluminum oxide layer, and a coating layer containing a conductive material, a resin, and an inorganic filler, in this order; and an Al—F bond is present in the aluminum oxide layer.

12 Claims, 7 Drawing Sheets

(56) References Cited

U.S. PATENT DOCUMENTS

2018/0342736 A1  11/2018  Matsushita et al.

FOREIGN PATENT DOCUMENTS

| JP | 2017-224402 A | 12/2017 |
| JP | 2018-200784 A | 12/2018 |

* cited by examiner

Reference Example 4

Example 1

Reference Example 4

Example 1

ELECTRODE CURRENT COLLECTOR INCLUDING ALUMINUM OXIDE LAYER HAVING ALUMINUM-FLUORIDE BOND, ALL SOLID STATE BATTERY, AND METHOD FOR PRODUCING

TECHNICAL FIELD

The present disclosure relates to an electrode current collector used in an all solid state battery.

BACKGROUND ART

An all solid state battery is a battery including a solid electrolyte layer between a cathode active material layer and an anode active material layer, and one of the advantages thereof is that the simplification of a safety device may be more easily achieved compared to a liquid-based battery including a liquid electrolyte containing a flammable organic solvent. A technology of arranging a film having a PTC (Positive Temperature Coefficient) function in an all solid state battery has been known.

For example, Patent Literature 1 discloses an all solid state battery comprising a PTC film including a conductive material and a resin in at least one of between a cathode current collector and a cathode active material layer, and between an anode current collector and an anode active material layer. The object of this technology is to provide an all solid state battery in which a battery reaction can be stopped when an internal short circuit occurs.

CITATION LIST

Patent Literature

Patent Literature 1: Japanese Patent Application Laid-Open (JP-A) No. 2017-130283

SUMMARY OF DISCLOSURE

Technical Problem

A nail penetration test has been known as a method of evaluating the safety of all solid state batteries. The nail penetration test is a test in which a conductive nail is penetrated through an all solid state battery to observe changes (such as a change in temperature) when an internal short circuit occurs inside the battery. When a cathode current collector contacts with an anode current collector in the nail penetration test, Joule heat is generated since short circuit part resistance (short circuit resistance) is small, and there is a risk that the battery temperature may rise.

Then, the inventor of the present disclosure has tried to form an aluminum oxide layer on at least one surface of the cathode current collector and the anode current collector. Further, he has tried to form a coating layer containing a conductive material, a resin, and an inorganic filler, on the surface of the aluminum oxide layer. When the inventor conducted a nail penetration test to an all solid state battery with the aluminum oxide layer and the coating layer, it was confirmed that the short circuit resistance increased.

Meanwhile, he has obtained a knowledge that the coating layer has been easily peeled off from the aluminum oxide layer when the load applied to the battery was increased in the nail penetration test. If the coating layer is peeled off from the aluminum oxide layer upon nail penetration, the effect of increasing the short circuit resistance may not be easily exhibited. The present disclosure has been made in view of the above circumstances, and a main object thereof is to provide an electrode current collector in which the peel-off of the coating layer and the aluminum oxide layer is inhibited.

Solution to Problem

In order to achieve the object, the present disclosure provides an electrode current collector to be used in an all solid state battery, the electrode current collector comprising: a current collecting layer, an aluminum oxide layer, and a coating layer containing a conductive material, a resin, and an inorganic filler, in this order; and an Al—F bond is present in the aluminum oxide layer.

According to the present disclosure, the presence of the Al—F bond in the aluminum oxide layer inhibits the peel-off of the coating layer and the aluminum oxide layer in the electrode current collector.

In the disclosure, the resin may contain a fluorine element.

In the disclosure, the aluminum oxide layer may include an opening, and the current collecting layer and the coating layer may contact with each other in the opening.

In the disclosure, a thickness of the aluminum oxide layer may be in a range of 10 nm to 1000 nm.

In the disclosure, the current collecting layer may contain an Al element.

Also, the present disclosure provides an all solid state battery comprising a cathode current collector, a cathode active material layer, a solid electrolyte layer, an anode active material layer, and an anode current collector in this order, wherein at least one of the cathode current collector and the anode current collector is the above described electrode current collector.

According to the present disclosure, the above described electrode current collector is used and thus the coating layer and the aluminum oxide layer are not easily peeled off in the all solid state battery.

Also, the present disclosure provides a method for producing an electrode current collector to be used in an all solid state battery, the method comprising: a preparing step of preparing a precursor member including a current collecting layer and an aluminum oxide layer; and a coating layer forming step of forming a coating layer by pasting a composition containing a conductive material, a resin, and an inorganic filler, as well as a fluorine element, on a surface of the aluminum oxide layer side of the precursor member, and followed by conducting a heat treatment; wherein an Al—F bond is formed in the aluminum oxide layer by the heat treatment in the coating layer forming step.

According to the present disclosure, the Al—F bond is formed in the aluminum oxide layer by the heat treatment so as to obtain the electrode current collector in which the peel-off of the coating layer and the aluminum oxide layer is inhibited.

In the present disclosure, a temperature for the heat treatment in the coating layer forming step may be 85° C. or more.

Advantageous Effects of Disclosure

The electrode current collector of the present disclosure exhibits effects of inhibiting the peel-off of the coating layer and the aluminum oxide layer.

DESCRIPTION OF EMBODIMENTS

The electrode current collector and the all solid state battery of the present disclosure are hereinafter explained in details.

A. Electrode Current Collector

Figure 1:
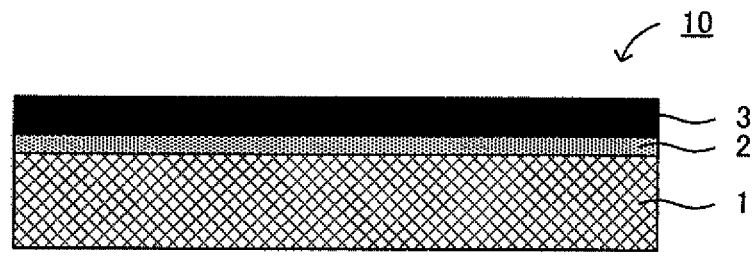
FIG. 1 is a schematic cross-sectional view exemplifying the electrode current collector of the present disclosure.

FIG. 1 is a schematic cross-sectional view exemplifying the electrode current collector of the present disclosure. Electrode current collector 10 illustrated in FIG. 1 comprises current collecting layer 1, aluminum oxide layer 2, and coating layer 3 containing a conductive material, a resin, and an inorganic filler, in this order. One of the features of electrode current collector 10 is that an Al—F bond is present in aluminum oxide layer 2.

According to the present disclosure, the presence of the Al—F bond in the aluminum oxide layer inhibits the peel-off of the coating layer and the aluminum oxide layer in the electrode current collector.

As described above, in the needle penetration test, a conductive nail is penetrated through an all solid state battery to observe changes (such as a change in temperature) when an internal short circuit occurs inside the battery. Since the cathode current collector and the anode current collector are the members with small resistance due to their functions, the short circuit resistance decreases when the cathode current collector contacts with the anode current collector upon the nail penetration. As the result, there is a risk that Joule heat is generated to raise the battery temperature.

Then, the inventor of the present disclosure has tried to form an aluminum oxide layer on at least one surface of the cathode current collector and the anode current collector. Further, he has tried to form a coating layer containing a conductive material, a resin, and an inorganic filler, on the surface of the aluminum oxide layer. An aluminum oxide has high resistance, and the inorganic filler included in the coating layer also has high resistance; thus, it is conceived that arranging the aluminum oxide layer and the coating layer increases the short circuit resistance.

Meanwhile, he has obtained a knowledge that the coating layer has been easily peeled off from the aluminum oxide layer when the load applied to the battery was increased in the nail penetration test. If the coating layer is peeled off from the aluminum oxide layer upon nail penetration, the effect of increasing the short circuit resistance may not be easily exhibited. To solve the problem, in the electrode current collector of the present disclosure, an Al—F bond is present in the aluminum oxide layer and thus the adhesive force of the coating layer and the aluminum oxide layer increases. Accordingly, the coating layer is not easily peeled off from the aluminum oxide layer upon the nail penetration and thus the effect of increasing the short circuit resistance can be more easily exhibited.

The electrode current collector of the present disclosure is hereinafter explained in each constitution.

1. Current Collecting Layer

The current collecting layer is a layer that has the main function (current collecting function) of the current collectors. It is preferable that the current collecting layer contains a metal element. There are no particular limitations on the metal element, and examples thereof may include an Al element, a Cu element, an Fe element, a Ti element, a Ni element, a Zn element, a Cr element, a Co element, a Au element, and a Pt element. The current colleting layer may be a simple substance of the metal element, and may be an alloy containing the metal element mainly. Above all, the current collecting layer preferably contains at least an Al element. In particular, it is preferable that the metal current collecting layer is a simple substance of Al, or an alloy mainly composed of an Al element.

Examples of the shape of the current collecting layer may include a foil shape. The thickness of the current collecting layer is, for example, 0.1 μm or more, and may be 1 μm or more. If the current collecting layer is too thin, there is a possibility that the current collecting function may be degraded. Meanwhile, the thickness of the current collecting layer is, for example, 1 mm or less, and may be 100 μm or less. If the current collecting layer is too thick, there is a possibility that the energy density of the all solid state battery may be degraded.

2. Aluminum Oxide Layer

The aluminum oxide layer is a layer formed between the current collecting layer and the coating layer, and usually has larger resistance than that of the current collecting layer.

The aluminum oxide layer is a layer containing an Al element and an O element. In addition, the Al element included in the aluminum oxide layer reacts with a F element, and forms an Al—F bond. In other words, an Al—F bond is present in the aluminum oxide layer. The presence of the Al—F bond can be confirmed by an X-ray photoelectron spectroscopy (XPS) measurement, as described in Examples later.

The aluminum oxide layer may be, for example, obtained by conducting an oxidation treatment to the surface of the current collecting layer containing an Al element. The aluminum oxide layer (oxidized film) obtained by the oxidation treatment has high adhesiveness with the current collecting layer.

An example of the oxidation treatment may be a liquid phase oxidation treatment. Examples of the liquid phase oxidation treatment may include a boehmite treatment. The boehmite treatment is a method to form an oxidized film (hydrated oxide film) on the surface of aluminum in an aqueous solution at a high temperature. An additional example of the oxidation treatment may be an anodizing oxidation treatment. The anodizing oxidation treatment is a treatment utilizing an electrochemical oxidation in an anode. Examples of the anodizing oxidation treatment may include an alumite treatment. The alumite treatment is a method to form an oxidized film (anodized oxidation film) on the surface of aluminum utilizing electrochemical oxidation.

Also, an additional example of the oxidation treatment may be a vapor-phase oxidation treatment, and a typical example thereof is a heat treatment in the atmosphere.

Also, the aluminum oxide layer may be, for example, obtained by pasting a composition containing an aluminum oxide particle. The composition may contain a dispersion medium; however, in that case, the dispersion medium is preferably removed by drying after pasting.

The thickness of the aluminum oxide layer is, for example, 10 nm or more, may be 30 nm or more, may be 70 nm or more, and may be 100 nm or more. If the aluminum oxide layer is too thin, there is a possibility that the short circuit resistance cannot be effectively increased. Meanwhile, the thickness of the aluminum oxide layer is, for example, 1000 nm or less, may be 300 nm or less, and may be 130 nm or less.

The surface roughness Ra of the aluminum oxide layer is, for example, 20 nm or more, may be 25 nm or more, and may be 30 nm or more. When the surface roughness Ra of the aluminum oxide layer is the specific value or more, for example, the coating layer bites into the concave part of the aluminum oxide layer due to at least one of the pressing pressure during the production of the battery and the confining pressure of the all solid state battery; thus, the state in which the coating layer contacts with the current colleting layer may be obtained as described later. Meanwhile, the surface roughness Ra of the aluminum oxide layer is, for example, 200 nm or less, and may be 50 nm or less.

3. Coating Layer

The coating layer is a layer containing a conductive material, a resin, and an inorganic filler.

Examples of the conductive material may include a carbon material and a metal material, and the carbon material is preferable. Examples of the carbon material may include carbon black such as furnace black, acetylene black, Ketjen black, and thermal black; carbon fiber such as carbon nanotube and carbon nanofiber; activated carbon, graphite, graphene, and fullerene. Examples of the shape of the conductive material may include a granular shape.

The proportion of the conductive material in the coating layer is, for example, preferably in a range of 5 volume % to 90 volume %. For example, from the viewpoint of increasing the contact resistance of the coating layer in the electrode current collector with the facing current collecting layer, the proportion of the conductive material in the coating layer is preferably small. In this case, the proportion of the conductive material in the coating layer is, for example, 30 weight % or less, may be 20 weight % or less, and may be 10 weight % or less.

The coating layer contains a resin in addition to the conductive material. It is preferable that the resin contains fluorine for its high chemical stability that may be a source of F for the Al—F bond. Examples of the fluorine-containing resin may include polyvinylidene fluoride (PVDF) and polytetra fluoroethylene (PTFE).

Also, the resin may be a thermoplastic resin. Examples of the thermoplastic resin may include polypropylene, polyethylene, polyvinyl chloride, polystyrene, an acrylonitrile butadiene styrene (ABS) resin, a methacrylic resin, polyamide, polyester, polycarbonate, and polyacetal. Also, as the resin, rubber such as SBR (styrene butadiene rubber), ABR (acrylonitrile butadiene rubber), and BR (butylene rubber) may be used.

The melting point of the resin is, for example, in a range of 80° C. to 300° C. The proportion of the resin in the coating layer is, for example, preferably in a range of 5 volume % to 90 volume %.

The coating layer contains an inorganic filler in addition to the conductive material. The inorganic filler usually has high resistance, thus the short circuit resistance can be increased. Also, since the inorganic filler is hard, PTC function may be easily exhibited even when confining pressure is applied to the all solid state battery. PTC stands for Positive Temperature Coefficient, which refers to the property the resistance changes to have a positive coefficient along with the temperature rise.

The resin included in the coating layer is expanded in volume along with the temperature rise, which enables the resistance of the coating layer to increase. However, in an all solid state battery, since confining pressure is usually applied along the thickness direction, the resin changes its form or flows due to the effect of the confining pressure, and the PTC properties may not be efficiently exhibited. In contrast, the addition of a hard inorganic filler to the coating layer allows the PTC property to be favorably exhibited even under the effect of the confining pressure.

Incidentally, the confining pressure applied to the all solid state battery is, for example, 0.1 MPa or more, may be 1 MPa or more, and may be 5 MPa or more. Meanwhile, the confining pressure is, for example, 100 MPa or less, may be 50 MPa or less, and may be 20 MPa or less.

Examples of the inorganic filler may include metal oxides and metal nitrides. Examples of the metal oxide may include alumna, zirconia, and silica. Examples of the metal nitride may include silicon nitride. The average particle size ($D_{50}$) of the inorganic filler is, for example, in a range of 50 nm to 5 μm, and may be in a range of 100 nm to 2 μm. Also, the content of the inorganic filler in the coating layer is, for example, 40 volume % or more, may be 50 volume % or more, and may be 60 volume % or more. Meanwhile, the content of the inorganic filler in the coating layer is, for example, 85 volume % or less, and may be 80 volume % or less.

It is preferable that the coating layer is a layer with high electron conductivity. The electron conductivity of the coating layer at 25° C. is, for example, $2 \times 10^{-2}$ S/cm or more, and may be $3 \times 10^{-2}$ S/cm or more. Meanwhile, the electron conductivity of the coating layer at 25° C. is, for example, 50 S/cm or less. The electron conductivity of the coating layer is preferably larger than the electron conductivity of the aluminum oxide layer. Also, the electron conductivity of the coating layer is preferably smaller than the electron conductivity of the current collecting layer.

The thickness of the coating layer is, for example, 0.01 μm or more, and preferably 1 μm or more. Meanwhile, the thickness of the coating layer is, for example, 30 μm or less. Also, the thickness of the coating layer is preferably larger than the thickness of the aluminum oxide layer. The reason therefor is to smoothen the movement of the electrons in the coating layer and in the current collecting layer. When the thickness of the coating layer is regarded as $T_C$ and the thickness of the aluminum oxide layer is regarded as $T_A$, the ratio of the thickness of the coating layer to the thickness of the aluminum oxide layer ($T_C/T_A$) is, for example, in a range of 6 to 300, and may be in a range of 10 to 200.

4. Electrode Current Collector

The electrode current collector of the present disclosure comprises the above described current collecting layer, aluminum oxide layer, and coating layer. Above all, in the present disclosure, it is preferable that the aluminum oxide layer has an opening, and the current collecting layer and the coating layer contact with each other in the opening. The reason therefor is to reduce the battery resistance during normal usage while increasing the short circuit resistance of the all solid state battery.

The short circuit resistance of the all solid state battery can be increased by arranging the aluminum oxide layer since the electron resistance of the aluminum oxide layer is high. On the other hand, the battery resistance during normal usage also tends to increase. To solve the problem, the current collecting layer and the coating layer (layer containing a conductive material) are made contact with each other in the opening of the aluminum oxide layer to reduce the battery resistance during the normal usage while increasing the short circuit resistance of the all solid state battery.

Figure 2A:
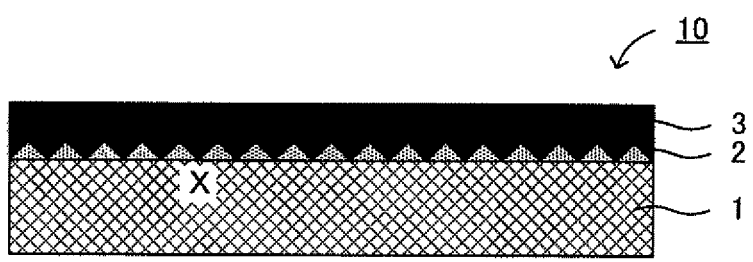
FIGS. 2A and 2B are schematic cross-sectional views exemplifying the electrode current collector of the present disclosure.

Electrode current collector 10 illustrated in FIG. 2A comprises current collecting layer 1, aluminum oxide layer 2, and coating layer 3 in this order. In addition, aluminum oxide layer 2 has opening X, and current collecting layer 1 and coating layer 3 contact with each other in opening X. Opening X illustrated in FIG. 2A may be, for example, obtained by conducting an oxidation treatment to the surface of current collecting layer 1 to form aluminum oxide layer (oxidized film) 2. Incidentally, in a typical oxidized film, a sparse region and a dense region co-exist; a minute opening X is formed at a part of the sparse region. Meanwhile, opening X illustrated in FIG. 2B may be obtained by, for example, forming aluminum oxide layer 2 in a pattern shape on the surface of current collecting layer 1.

Figure 2B:
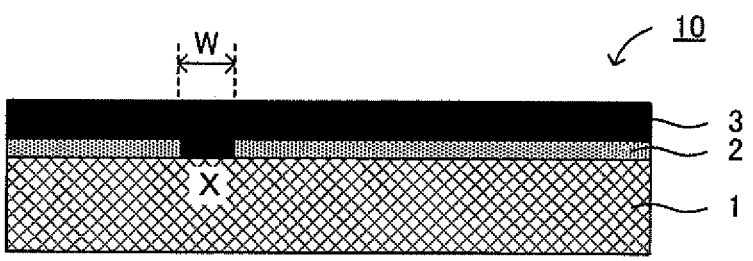

For example, as exemplified in FIG. 2B, when the width of opening X is regarded as W, the value of W is, for example, in a range of 0.1 μm to 10 μm, and may be in a range of 0.5 μm to 8 μm. Also, the area rate of opening X (total area of the opening/(total area of opening+non-opening part) is, for example, in a range of 0.1% to 2%, and may be in a range of 0.5% to 1%. Also, there are no particular limitations on the shape of the opening in a planar view, and examples thereof may include a random shape, a stripe shape, and a dot shape.

In the electrode current collector of the present disclosure, usually, the surface of the coating layer side is arranged so as to face the solid electrolyte layer. Also, the electrode current collector is usually used in an all solid state battery. The electrode current collector may be a cathode current collector, and may be an anode current collector.

B. All Solid State Battery

Figure 3:
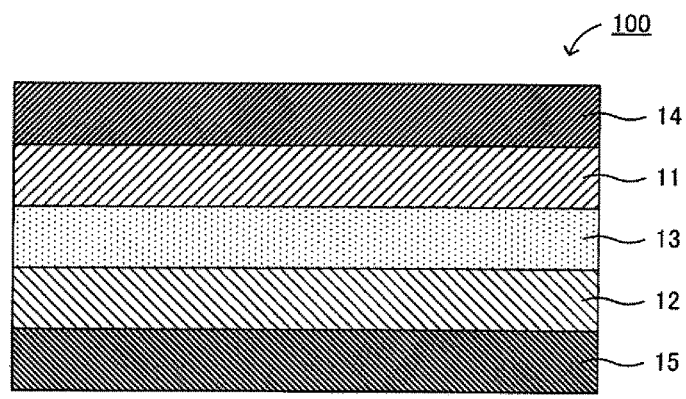
FIG. 3 is a schematic cross-sectional view exemplifying the all solid state battery of the present disclosure.

FIG. 3 is a schematic cross-sectional view illustrating an example of the all solid state battery of the present disclosure. All solid state battery 100 illustrated in FIG. 3 comprises cathode active material layer 11 containing a cathode active material, anode active material layer 12 containing an anode active material, solid electrolyte layer 13 formed between cathode active material layer 11 and anode active material layer 12, cathode current collector 14 for collecting currents of cathode active material layer 11, and anode current collector 15 for collecting currents of anode active material layer 12. That is, all solid state battery 100 has cathode current collector 14, cathode active material layer 11, solid electrolyte layer 13, anode active material layer 12, and anode current collector 15 in this order in the thickness direction. The present disclosure features the configuration that at least one of cathode current collector 14 and anode current collector 15 is the above described electrode current corrector.

According to the present disclosure, the above described electrode current collector is used, and thus the coating layer and the aluminum oxide layer are not easily peeled off in the all solid state battery.

1. Cathode Current Collector and Anode Current Collector

At least one of the cathode current collector and the anode current collector is the electrode current collector described in "A. Electrode current collector" above. Just the cathode current collector may be the above described electrode current collector, and just the anode current collector may be the above described electrode current collector. Also, both of the cathode current collector and the anode current collector may be the above described electrode current collector. In this case, the current collecting layer in the cathode current collector and the current collecting layer in the anode current collector may contain the same metal element, and may respectively contain a different metal element.

Also, the contact resistance of the cathode current collector and the anode current collector is preferably high even in a high pressure state. Incidentally, "the contact resistance of the cathode current collector and the anode current collector" is defined as follows. When one of the cathode current collector and the anode current collector is the above describe electrode current collector, "the contact resistance of the cathode current collector and the anode current collector" refers to the resistance when the coating layer in the electrode current collector is made contact with the other current collector. On the other hand, when both of the cathode current collector and the anode current collector are the above described electrode current collector, "the contact resistance of the cathode current collector and the anode current collector" refers to the resistance when the coating layer in one of the electrode current collectors is made contact with the coating layer in the other electrode current collector. The contact resistance of the cathode current collector and the anode current collector under the pressure of 100 MPa is, for example, 0.5 Ω·cm$^2$ or more, and may be 1.1 Ω·cm$^2$ or more.

Also, one of the cathode current collector and the anode current collector may be the electrode current collector including the coating layer containing the conductive material, the resin, and the inorganic filler, and the other of the cathode current collector and the anode current collector may be a current collector containing a Cu-element. The short circuit resistance may be increased since the coating layer containing the inorganic filler and the current collector containing the Cu element have high contact resistance.

2. Cathode Active Material Layer

The cathode active material layer contains at least a cathode active material, and may further contain at least one of a solid electrolyte material, a conductive material, a binder, and a thickener, as required.

There are no particular limitations on the cathode active material, and examples thereof may include oxide active materials. Examples of the oxide active material may include rock salt bed type active materials such as $LiCoO_2$, $LiMnO_2$, $LiNiO_2$, $LiVO_2$, and $LiNi_{1/3}Co_{1/3}Mn_{1/3}O_2$; spinel type active materials such as $LiMn_2O_4$, $Li_4Ti_5O_{12}$, and $Li(Ni_{0.5}Mn_{1.5})O_4$; and olivine type active materials such as $LiFePO_4$, $LiMnPO_4$, $LiNiPO_4$, and $LiCoPO_4$. Also, as the oxide active material, a material such as a LiMn spinel active material represented by $Li_{1+x}Mn_{2-x-y}M_yO_4$ (M is at least one kind of Al, Mg, Co, Fe, Ni, and Zn; $0<x+y<2$), and lithium titanate may be used.

Also, a coating layer containing a Li ion conductive oxide may be formed on the surface of the cathode active material. The reason therefor is to inhibit the reaction of the cathode active material with the solid electrolyte material. Examples of the Li ion conductive oxide may include $LiNbO_3$, $Li_4Ti_5O_{12}$, and $Li_3PO_4$. The thickness of the coating layer is, for example, in a range of 0.1 nm to 100 nm, and may be in a range of 1 nm to 20 nm. The coverage of the coating layer in the surface of the cathode active material is, for example, 50% or more, and may be 80% or more.

There are no particular limitations on the solid electrolyte material, and examples thereof may include inorganic solid electrolyte materials such as sulfide solid electrolyte materials and oxide solid electrolyte materials. Examples of the sulfide solid electrolyte material may include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$-Lii, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that m and n is a positive number; Z is either one of Ge, Zn, and Ga), $Li_2S$—$GeS_2$, $Li_2S$—$SiS_2$—$Li_3PO_4$, and $Li_2S$—$SiS_2$—$Li_xMO_y$ (provided that x and y is a positive number; M is either one of P, Si, Ge, B, Al, Ga, and In). Incidentally, the description "$Li_2S$—$P_2S_5$" signifies a sulfide solid electrolyte material comprising a raw material composition that contains $Li_2S$ and $P_2S_5$, and the likewise applies to other descriptions.

In particular, the sulfide solid electrolyte material is preferably provided with an ion conductor that contains Li, A (A is at least one kind of P, Si, Ge, Al, and B), and S. Further, the ion conductor preferably has an anion structure of an ortho composition ($PS_4^{3-}$ structure, $SiS_4^{4-}$ structure, $GeS_4^{4-}$ structure, $AlS_3^{3-}$ structure, and $BS_3^{3-}$ structure) as the main component of an anion. The reason therefor is to allow the sulfide solid electrolyte material to have high chemical stability. The proportion of the anion structure of an ortho composition with respect to all the anion structures in the ion conductor is, preferably 70 mol % or more, and more preferably 90 mol % or more. The proportion of the anion structure of an ortho composition may be determined by methods such as a Raman spectroscopy, NMR, and XPS.

The sulfide solid electrolyte material may contain a lithium halide in addition to the ion conductor. Examples of the lithium halide may include LiF, LiCl, LiBr, and LiI, and among them, LiCl, LiBr, and LiI are preferable. The proportion of LiX (X=I, Cl, or Br) in the sulfide solid electrolyte material is, for example, in a range of 5 mol % to 30 mol %, and may be in a range of 15 mol % to 25 mol.

The solid electrolyte material may be a crystalline material, and may be an amorphous material. Also, the solid electrolyte material may be glass, and may be crystallized glass (glass ceramic). Examples of the shape of the solid electrolyte material may include a granular shape.

Examples of the conductive material may include carbon materials such as acetylene black (AB), Ketjen black (KB), carbon fiber, carbon nanotube (CNT), and carbon nanofiber (CNF). Also, examples of the binder may include rubber-based binders such as butylene rubber (BR) and styrene butadiene rubber (SBR); and fluorine-based binders such as polyvinylidene fluoride (PVdF).

Also, the thickness of the cathode active material layer is, for example, in a range of 0.1 μm to 300 μm, and may be in a range of 0.1 μm to 100 μm.

3. Anode Active Material Layer

The anode active material layer contains at least an anode active material, and may further contain at least one of a solid electrolyte material, a conductive material, a binder, and a thickener, as required.

There are no particular limitations on the anode active material, and examples thereof may include metal active materials, carbon active materials, and oxide active materials. Examples of the metal active material may include a simple substance of metal and a metal alloy. Examples of the metal element included in the metal active material may include Si, Sn, In, and Al. The metal alloy is preferably an alloy that contains the metal element as the main component. Examples of the Si alloy may include a Si—Al-based alloy, a Si—Sn-based alloy, a Si—In-based alloy, a Si—Ag-based alloy, a Si—Pb-based alloy, a Si—Sb-based alloy, a Si—Bi-based alloy, a Si—Mg-based alloy, a Si—Ca-based alloy, a Si—Ge-based alloy, and a Si—Pb-based alloy. Incidentally, for example, the Si—Al-based alloy signifies an alloy that contains at least Si and Al; it may be an alloy that contains only Si and Al, and may be an alloy that further contains an additional element thereto. Likewise applies to the alloys other than the Si—Al-based alloy. The metal alloy may be a two component alloy, and may be a multi component alloy of three components or more.

On the other hand, examples of the carbon active material may include methocarbon microbeads (MCMB), highly oriented pyrolytic graphite (HOPG), hard carbon, and soft carbon. Also, examples of the oxide active material may include a lithium titanate such as $Li_4Ti_5O_{12}$.

Examples of the shape of the anode active material may include a granular shape. The average particle size ($D_{50}$) of the anode active material is, for example, in a range of 10 nm to 50 μm, and may be in a range of 100 nm to 20 μm. The proportion of the anode active material in the anode active material layer is, for example, 50 weight % or more, and may be in a range of 60 weight % to 99 weight %.

The solid electrolyte material, the binder, and the thickener used in the anode active material layer are in the same contents as those described in "2. Cathode active material layer" above; thus, the descriptions herein are omitted. The thickness of the anode active material layer is, for example, in a range of 0.1 μm to 300 μm, and may be in a range of 0.1 μm to 100 μm.

4. Solid Electrolyte Layer

The solid electrolyte layer is a layer formed between the cathode active material layer and the anode current collector. Also, the solid electrolyte layer contains at least a solid electrolyte material, and may further contain a binder as required. The solid electrolyte material and the binder used in the solid electrolyte layer are in the same contents as those described in "2. Cathode active material layer" above; thus, the descriptions herein are omitted.

The content of the solid electrolyte material in the solid electrolyte layer is, for example, in a range of 10 weight % to 100 weight %, and may be in a range of 50 weight % to 100 weight %. Also, the thickness of the solid electrolyte layer is, for example, in a range of 0.1 μm to 300 μm, and may be in a range of 0.1 μm to 100 μm.

5. All Solid State Battery

The all solid state battery of the present disclosure is preferably an all solid lithium ion battery. Also, the all solid state battery may be a primary battery and may be a secondary battery, but preferably a secondary battery among them so as to be repeatedly charged and discharged, and be useful as a car-mounted battery, for example. Examples of the shape of the all-solid-state battery may include a coin shape, a laminate shape, a cylindrical shape, and a square shape. Also, the all solid state battery of the present disclosure may be a layered battery in which a plurality of power generating elements including a cathode active material layer, a solid electrolyte layer, and an anode active material layer, are layered. The layered battery may be a battery in which each power generating element is connected in parallel, and may be a battery in which each power generating element is connected in series.

C. Method for producing electrode current collector

Figure 4A:
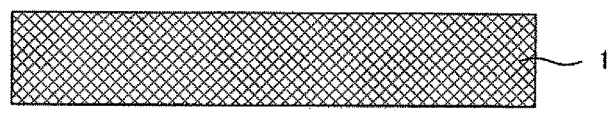
FIGS. 4A to 4C are schematic cross-sectional views explaining the method for producing the electrode current collector of the present disclosure.
Figure 4B:
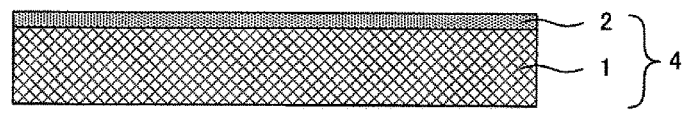
Figure 4C:
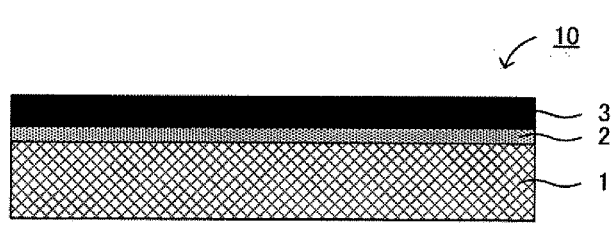

FIGS. 4A to 4C are schematic cross-sectional views exemplifying the method for producing the electrode current collector of the present disclosure. In FIGS. 4A to 4C, first, current collecting layer 1 that is an Al foil is prepared (FIG. 4A). Next, an oxidation treatment is conducted to one surface of current collecting layer 1 to form aluminum oxide layer 2 (FIG. 4B). In this manner, precursor member 4 including current collecting layer 1 and aluminum oxide layer 2 is prepared. Next, a composition containing a conductive material, a resin, and an inorganic filler, as well as a fluorine element, is pasted on aluminum oxide layer 2 side surface of precursor member 4, followed by conducting a heat treatment to form coating layer 3 (FIG. 4C). This heat treatment forms an Al—F bond in aluminum oxide layer 2, and thereby electrode current collector 10 is obtained.

According to the present disclosure, the Al—F bond is formed in the aluminum oxide layer by the heat treatment so as to obtain the electrode current collector in which the peel-off of the coating layer and the aluminum oxide layer is inhibited.

The method for producing the electrode current collector of the present disclosure is hereinafter explained in each step.

1. Preparing Step

The preparing step in the present disclosure is a step of preparing a precursor member including a current collecting layer and an aluminum oxide layer. The precursor member may be produced by oneself, and may be purchased. The current collecting layer and the aluminum oxide layer are in the same contents as those described in "A. Electrode current collector" above; thus the descriptions herein are omitted.

2. Coating Layer Forming Step

The coating layer forming step in the present disclosure is a step of forming a coating layer by pasting a composition (composition for forming coating layer) containing a conductive material, a resin, an inorganic filler, as well as a fluorine element, on a surface of the aluminum oxide layer side of the precursor member, followed by conducting a heat treatment. Further, an Al—F bond is formed in the aluminum oxide layer by this heat treatment.

"The surface of the aluminum oxide layer side of the precursor member" refers to the surface of the precursor member positioned in the opposite side of the current collecting layer on the basis of the aluminum oxide layer.

The composition for forming coating layer contains a conductive material, a resin, and an inorganic filler. These materials are in the same contents as those described in "A. Electrode current collector" above; thus, the descriptions herein are omitted. Also, the composition for forming coating layer preferably contains a dispersion medium. Further, the composition for forming coating layer contains a fluorine element. The fluorine element becomes a F-source of the Al—F bond.

In the present disclosure, it is preferable that at least one of the conductive material, the resin, and the inorganic filler contains a fluorine element. In particular, it is preferable that the resin contains a fluorine element. Incidentally, in the present disclosure, the conductive material, the resin, and the inorganic filler may not contain a fluorine element. For example, the Al—F bond may be formed on the occasion of the heat treatment by separately adding an arbitrary fluoride to the composition for forming coating layer.

Examples of the method for pasting the composition for forming coating layer may include a doctor blade method, a die coat method, a gravure coat method, a spray coat method, a static coat method, and a bar coat method. Also, the heat treatment is conducted to the pasted composition for forming coating layer to form an Al—F bond in the aluminum oxide layer. A heat treatment temperature is, for example, 60° C. or more, and may be 85° C. or more. Meanwhile, the heat treatment temperature is, for example, 200° C. or less. Also, the heat treatment time is, for example, in a range of 1 minute to 5 minutes.

3. Electrode Current Collector

The electrode current collector obtained by the above described production method is in the same contents as those described in "A. Electrode current collector" above; thus, the descriptions herein are omitted.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Comparative Example 1

Production of Cathode

A cathode active material ($Li_{1.15}Ni_{1/3}Co_{1/3}Mn_{1/3}W_{0.005}O_2$) was coated with $LiNbO_3$ in an atmospheric environment using a tumbling fluidized bed granulating-coating machine (from Powrex Corporation). After that, the product was burned in an atmospheric environment, and thus a coating layer including $LiNbO_3$ was formed on the surface of the cathode active material. Thereby, a cathode active material having a coating layer on its surface was obtained.

Next, added to a container made of polypropylene (PP) were butyl butyrate, butyl butyrate solution of 5 weight % that was a PVdF-based binder (from KUREHA CORPORATION), the obtained cathode active material, a sulfide solid electrolyte material ($Li_2S$—$P_2S_5$-based glass ceramic including LiI and LiBr; average particle size $D_{50}$=0.8 µm), and a conductive material (vapor-grown carbon fiber, VGCF, from SHOWA DENKO K.K), in the weight ratio of the cathode active material:the sulfide solid electrolyte material: the conductive material:the binder=85:13:1:1. Next, the container made of PP was agitated for 30 seconds by an ultrasonic dispersion apparatus (UH-50 from SMT Corporation). Next, the container made of PP was shaken by a shaker (TTM-1 from SIBATA SCIENTIFIC TECHNOLOGY LTD.) for 3 minutes, and further agitated by the ultrasonic dispersion apparatus for 30 seconds to obtain a coating solution.

Next, an Al foil (15 µm thick, 1N30 from UACJ) was prepared. The obtained coating solution was shaken for 3 minutes by a shaker (TTM-1 from SIBATA SCIENTIFIC TECHNOLOGY LTD.), and then pasted on the Al foil using an applicator by a blade method. The product was dried naturally, and then dried on a hot plate at 100° C. for 30 minutes to form a cathode active material layer on one surface of the cathode current collector. Next, the product was cut according to the size of the battery, and thereby a cathode was obtained.

Production of Anode

Added to a container made of PP were butyl butyrate, butyl butyrate solution of 5 weight % that was a PVdF-based binder (from KUREHA CORPORATION), an anode active material (silicon from JAPAN PURE CHEMICAL CO., LTD., average particle size $D_{50}$=5 μm), a sulfide solid electrolyte material ($Li_2S$—$P_2S_5$-based glass ceramic including LiI and LiBr; average particle size $D_{50}$=0.8 μm), and a conductive material (vapor-grown carbon fiber, VGCF, from SHOWA DENKO K.K), in the weight ratio of the anode active material:the sulfide solid electrolyte material:the conductive material:the binder=55:42:2:1. Next, the container made of PP was agitated for 30 seconds by an ultrasonic dispersion apparatus (UH-50 from SMT Corporation). Next, the container made of PP was shaken by a shaker (TTM-1 from SIBATA SCIENTIFIC TECHNOLOGY LTD.) for 30 minutes, and further agitated by the ultrasonic dispersion apparatus for 30 seconds to obtain a coating solution.

Figure 5A:
FIGS. 5A to 5E are schematic cross-sectional views explaining the method for producing an evaluation battery.
Figure 5B:
Figure 5C:

Next, as illustrated in FIG. 5A, a Cu foil (anode current collector 15, 12 μm thick, an electrolyte Cu foil from Furukawa Electric Co., Ltd.) was prepared. The obtained coating solution was shaken for 3 minutes by a shaker (TTM-1 from SIBATA SCIENTIFIC TECHNOLOGY LTD.), and then pasted on the Cu foil using an applicator by a blade method. The product was dried naturally, and then dried on a hot plate at 100° C. for 30 minutes. Thereby, as illustrated in FIG. 5B, anode active material layer 12 was formed on one surface of the Cu foil (anode current collector 15). After that, as illustrated in FIG. 5C, the treatment in the same manner was conducted to form anode active material layer 12 on the other surface of the Cu foil, thus anode active material layer 12 was formed on the both surfaces of the Cu foil (anode current collector 15). Next, the product was cut according to the size of the battery, and thereby an anode was obtained.

Production of solid electrolyte layer Added to a container made of PP were heptane, 5 weight % of heptane solution that was a butylene rubber-based binder (from JSR Corporation), and a sulfide solid electrolyte material ($Li_2S$—$P_2S_5$-based glass ceramic including LiI and LiBr, average particle size $D_{50}$=2.5 μm). Next, the container made of PP was agitated for 30 seconds by an ultrasonic dispersion apparatus (UH-50 from SMT Corporation). Next, the container made of PP was shaken for 30 minutes by a shaker (TTM-1 from SIBATA SCIENTIFIC TECHNOLOGY LTD.), and further agitated for 30 seconds by the ultrasonic dispersion apparatus, and thereby a coating solution was obtained.

Next, an Al foil (from Nippon Foil Mfg. Co., Ltd.) was prepared. The obtained coating solution was shaken for 3 minutes by a shaker (TTM-1 from SIBATA SCIENTIFIC TECHNOLOGY LTD.), and then pasted on the Al foil using an applicator by a blade method. The product was dried naturally, and then dried on a hot plate at 100° C. for 30 minutes. Next, the product was cut according to the size of the battery, and thereby a transferring member having the Al foil and a solid electrolyte layer was obtained.

Production of Evaluation Battery

Figure 5D:
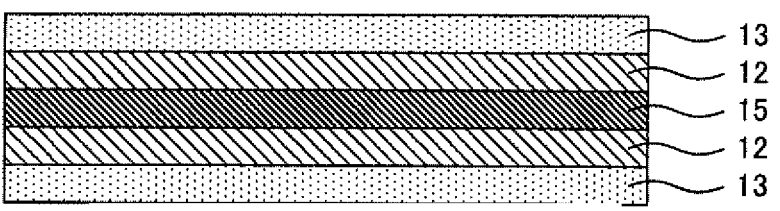
Figure 5E:
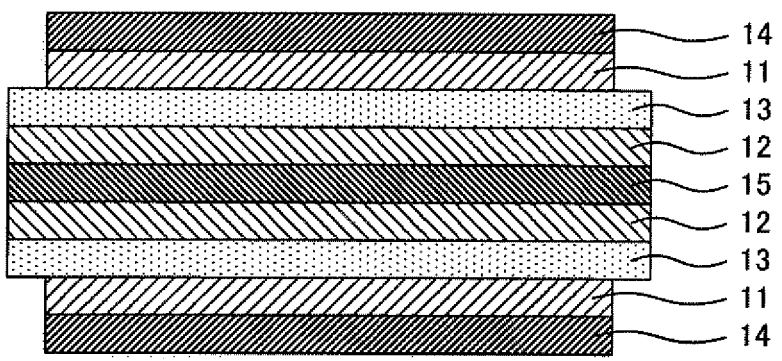

Two of the obtained transferring member was respectively placed on the anode active material layer formed on the both surfaces of the anode current collector, and pressed at the pressure of 4 ton/cm$^2$ by a cold isostatic pressing method (CIP method). After that, the Al foil of the transferring member was peeled off. Thereby, as shown in FIG. 5D, solid electrolyte layer 13 was formed on anode active material layer 12. Next, two of the obtained cathodes as described above was respectively placed on the solid electrolyte layer formed on the both surfaces of the anode current collector, and pressed at the pressure of 4 ton/cm$^2$ by a cold isostatic pressing method (CIP method). Thereby, as shown in FIG. 5E, cathode active material layer 11 and cathode current collector 14 were formed on solid electrolyte layer 13. After that, the product was confined at 10 MPa, and thereby an evaluation battery (2-layered battery) was obtained.

Comparative Example 2

A coating layer was formed on the surface of an Al foil (15 μm thick, 1N30 from UACJ). First, a paste was produced by mixing a conductive material (furnace black, average primary particle radius of 66 nm, from Tokai Carbon Co., Ltd.), an inorganic filler (alumina, CB-P02 from SHOWA DENKO K.K), and PVDF (KF polymer L #9130 from KUREHA CORPORATION) in the volume ratio of the conductive material:the inorganic filler:PVDF=10:60:30, with N-methylpyrrolidone (NMP). The obtained paste was pasted on the Al foil so that the thickness after drying the product became 10 μm. The product was dried in a drying furnace (drying at 25° C. for 6 hours and then drying at 85° C. for 30 seconds) to form a coating layer. Thereby, a cathode current collector having a coating layer on the surface of the Al foil (current collecting layer) was obtained. The electron conductivity of the coating layer at 25° C. was approximately $3.8 \times 10^{-2}$ S/cm. Also, an evaluation battery was obtained in the same manner as in Comparative Example 1 except that the obtained cathode current collector was used.

Reference Example 1

Boehmite treatment, in which an Al foil (15 μm thick, 1N30 from UACJ Corporation) was soaked in an alkali solution at 100° C. for 20 seconds, was conducted. Thereby, a cathode current collector having an aluminum oxide layer on the surface of the Al foil (current collecting layer) was obtained. After that, a coating layer was formed on the surface of the aluminum oxide layer in the same manner as in Comparative Example 2. Thereby, a cathode current collector having the Al foil (current collecting layer), the aluminum oxide layer, and the coating layer in this order was obtained. An evaluation battery was obtained in the same manner as in Comparative Example 1 except that the obtained cathode current collector was used.

Reference Example 2

An evaluation battery was obtained in the same manner as in Reference Example 1 except that the treatment time of the boehmite treatment was changed to 40 seconds.

[Evaluation]

Observation of Aluminum Oxide Layer

The thickness of the aluminum oxide layer was measured from the results of the cross-section observation of the cathode current collector produced in Comparative Examples 1 and 2, and Reference Examples 1 and 2. Also, the surface roughness of the aluminum oxide layer was measured using an atomic force microscope. The results are shown in Table 1.

Figure 6:
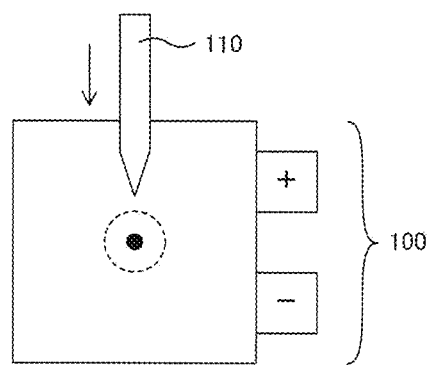
FIG. 6 is a schematic perspective view explaining the nail penetration test.

Short circuit resistance measurement Short circuit resistance of the evaluation batteries obtained in Comparative Examples 1 and 2 and Reference Examples 1 and 2 was measured. In the short circuit resistance measurement, as shown in FIG. 6, evaluation battery 100 was placed on an Al plate of 3 mm thickness (not illustrate), and needle 110 was penetrated. The conditions for the needle penetration test were as follows:

Charge state: fully charged

Resistance meter: RM3542 from HIOKI E.E. CORPORATION

Nail: SK material (ϕ8 mm, point angle 60°)

Nail speed: 0.5 mm/sec.

Figure 7:
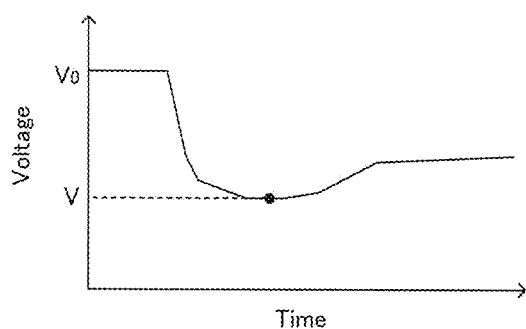
FIG. 7 is a graph exemplifying a voltage profile in the nail penetration test.

The short circuit resistance of the evaluation battery was determined from the voltage profile during the nail penetration. An example of the voltage profile is shown in FIG. 7. As shown in FIG. 7, the voltage of the evaluation battery falls during the nail penetration. Here, the initial voltage is regarded as $V_0$, and the minimum voltage during nail penetration is regarded as V. Also, the internal resistance of the evaluation battery was measured in advanced, and the internal resistance is regarded as r. Also, the short circuit resistance of the evaluation battery is regarded as R. When all the current caused by the voltage fall during the nail penetration is presumed to be short circuit current, the relation of $V/R=(V_0-V)/r$ is satisfied. From this relation, short circuit resistance R of the evaluation batteries was calculated. The results are shown in Table 1.

Incidentally, the values of the short circuit resistance in Table 1 are the relative values when the short circuit resistance of Comparative Example 1 is determined as 1.

Battery Resistance Measurement

The battery resistance of the evaluation batteries obtained in Comparative Examples 1 and 2 and Reference Examples 1 and 2 was measured. A cycle testing machine (from NITTETSU ELEX CO., LTD. ver8.00) was used for the battery resistance measurement. The result is shown in Table 1. Incidentally, the values of the battery resistance in Table 1 are the relative values when the battery resistance of Comparative Example 1 is determined as 1.

TABLE 1

| | Boehmite treatment | | | | |
|---|---|---|---|---|---|
| | Treatment time [Second] | Thickness of oxide layer [nm] | Surface roughness Ra [nm] | Coating layer | Short circuit resistance ratio | Battery resistance ratio |
| Comparative Example 1 | 0 | 0 | 10 | None | 1 | 1 |
| Comparative Example 2 | 0 | 0 | 10 | Present | 1.63 | 1.00 |
| Reference Example 1 | 20 | 30 | 20 | Present | 8.97 | 1.13 |
| Reference Example 2 | 40 | 70 | 30 | Present | 123 | 1.36 |

As shown in Table 1, when Comparative Example 1 is compared to Comparative Example 2, it was confirmed that the short circuit resistance was increased by arranging the coating layer. Further, when Comparative Example 2 was compared to Reference Examples 1 and 2, it was confirmed that the short circuit resistance was increased by arranging the aluminum oxide layer. Also, in Reference Examples 1 and 2, since the current collecting layer and the coating layer contacted with each other in the opening of the aluminum oxide layer, the battery resistance in the same level as of Comparative Example 2 was maintained, and thus the battery resistance during the normal use of the battery was low.

Reference Example 3

An evaluation battery (66-layered battery) was obtained in the same manner as in Reference Example 1, except that 33 pieces of the 2-layered battery were layered.

[Evaluation]

Battery observation after nail penetration test

A nail penetration test was conducted for the evaluation battery obtained in Reference Example 3, and thereafter the state of the nail penetrated part was observed. The conditions for the nail penetration test were as follows:

Charge state: fully charged

Resistance meter: RM3542 from HIOKI E.E. CORPORATION

Nail: SK material (φ8 mm, point angle 60°)

Nail speed: 25 mm/sec.

Figure 8:
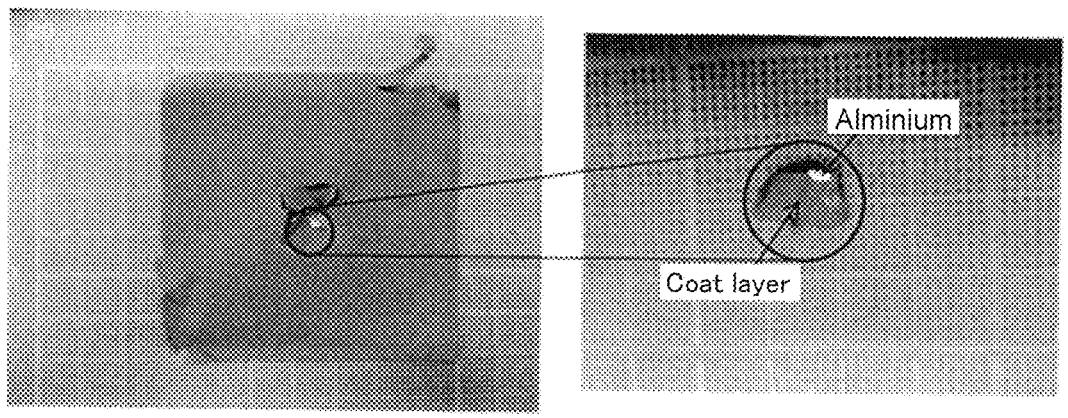
FIG. 8 is an observation image of the nail penetrated part after the nail penetration test.

Incidentally, since the nail speed is fixed, when the number of layer in the evaluation battery increased, the load to be applied to the evaluation battery increased. The observation image of the nail penetrated part is shown in FIG. 8. As shown in FIG. 8, the part where the aluminum oxide layer was exposed was confirmed. From this, it was confirmed that the coating layer was peeled off from the aluminum oxide layer.

Reference Example 4

Boehmite treatment, in which an Al foil (15 μm thick, 1N30 from UACJ Corporation) was soaked in an alkali solution at 100° C. for 80 seconds, was conducted. Thereby, a cathode current collector having an aluminum oxide layer on the surface of the Al foil (current collecting layer) was obtained. After that, a coating layer was formed on the surface of the aluminum oxide layer in the same manner as in Comparative Example 2. Thereby, a cathode current collector having the Al foil (current collecting layer), the aluminum oxide layer, and the coating layer in this order was obtained.

Example 1

Boehmite treatment, in which an Al foil (15 μm thick, 1N30 from UACJ Corporation) was soaked in an alkali solution at 100° C. for 80 seconds, was conducted. Thereby, a cathode current collector having an aluminum oxide layer on the surface of the Al foil (current collecting layer) was obtained. Next, a coating layer was formed on the surface of the aluminum oxide layer. A paste was produced in the same manner as in Comparative Example 2. The obtained paste was pasted on the Al foil so that the thickness after drying became 10 μm, and dried for 1 minute at 85° C. using an electric furnace to form a coating layer. Thereby, a cathode current collector having the Al foil (current collecting layer), the aluminum oxide layer, and the coating layer in this order was obtained.

[Evaluation]

Adhesive Force Measurement

Figure 9:
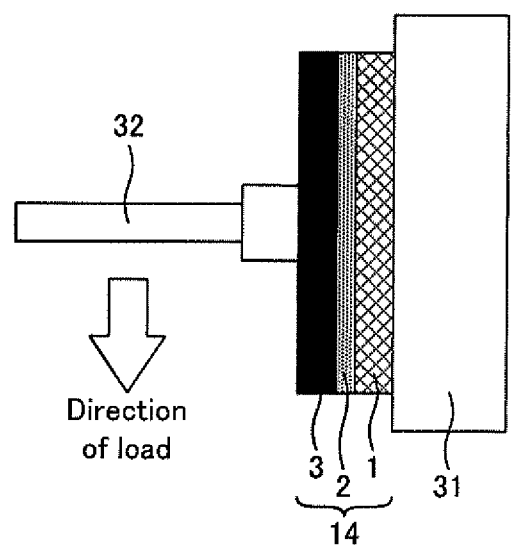
FIG. 9 is a schematic cross-sectional view explaining an adhesive force measurement.
Figure 10:
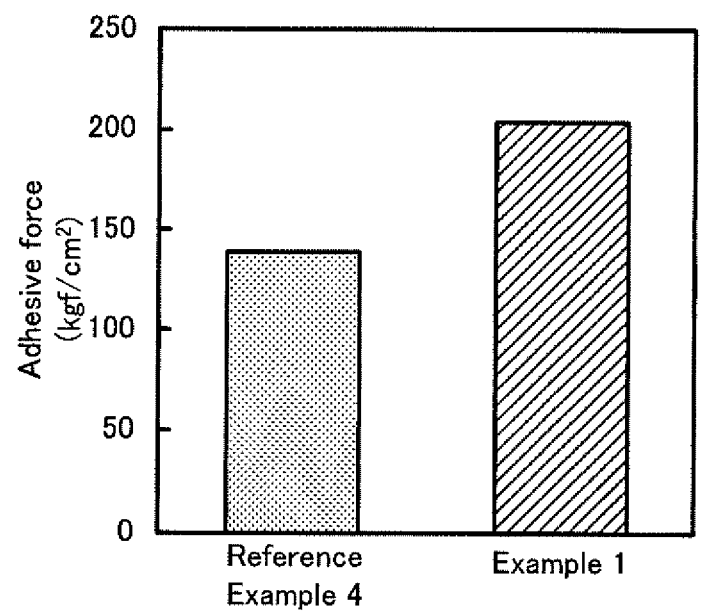
FIG. 10 is the result of the adhesive force measurement.

An adhesive force measurement was conducted for the cathode current collectors produced in Example 1 and Reference Example 4. In the adhesive force measurement, as shown in FIG. 9, cathode current collector 14 was fixed on one surface of reinforcing plate 31. After that, stud-pin 32 was fixed on the surface of coating layer 3 in cathode current collector 14 using an adhesive, and applied load vertically downward. The measurement was conducted using a thin film adherence strength measurement device (Romulus from Quad group) as a measurement device, in the conditions of the range of load being 0 to 100 kg and the load increasing speed being 2 kg/sec. Incidentally, the radius of the contact part where the stud-pin contacted the coating layer was φ 2.7 mm. The results are shown in FIG. 10. As shown in FIG. 10, the adhesive force of Reference Example 4 was 140 kgf/cm², and the adhesive force of Example 1 was 205 kgf/cm²; the adhesive force increased by 46.5%.

XPS Measurement

Figure 11A:
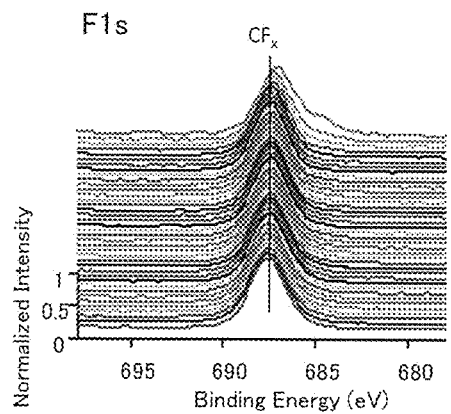
FIGS. 11A and 11B are the results of XPS measurements.
Figure 11B:
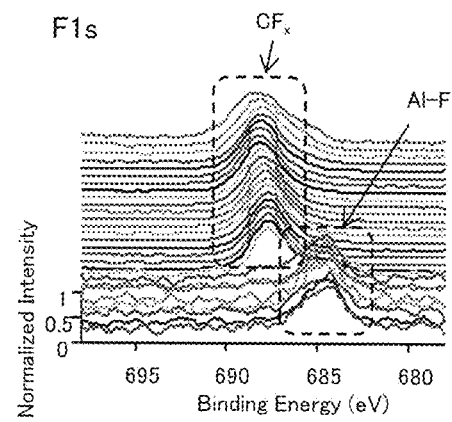

An X-ray photoelectron spectroscopy (XPS) measurement was conducted for the cathode current collectors produced in Example 1 and Reference Example 4. The measurement was conducted using an automated scanning type X-ray photoelectron spectroscopy device (Quantera SXM from ULVAC-PHI, INCORPORATED) as a measurement device, and single-colored AlKa as an X-ray source, in the conditions of the X-ray output of 12.4 W, the X-ray beam size of 50 μmφ, and the photoelectron take-out angle of 45°. The results are shown in FIGS. 11A and 11B. As shown in FIGS. 11A and 11B, it was confirmed that the Al—F bond was present in the aluminum oxide layer of Example 1, but the Al—F bond was not present in the aluminum oxide layer of Reference Example 4. In other words, it was confirmed that the F elements included in the coating layer were spread due to heat, and reacted with the Al element included in the aluminum oxide layer. The PVDF used in the coating layer was known to have high chemical stability; however, the F element included in the PVDF surprisingly reacted with the Al element included in the aluminum oxide layer to form the Al—F bond.

FE-SEM Observation

Figure 12A:
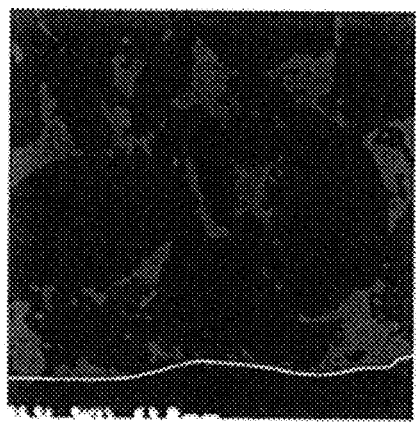
FIGS. 12A and 12B are the results of FE-SEM observation.
Figure 12B:
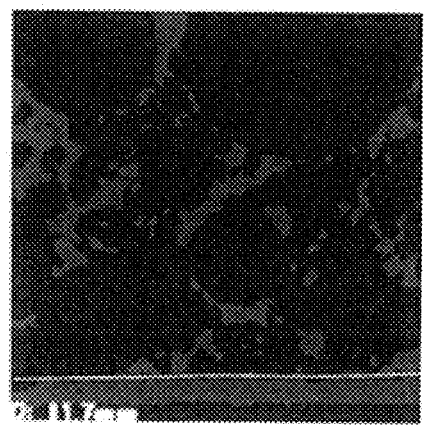
Figure 13:
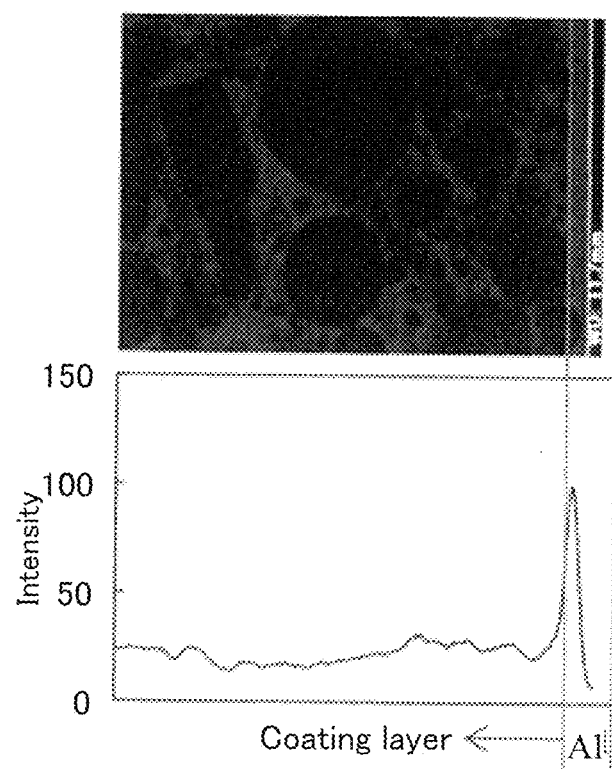
FIG. 13 is the result of FE-SEM observation.

Observation by a field emission type scanning electron microscope (FE-SEM) was conducted for the cathode current collectors produced in Example 1 and Reference Example 4. The cross-section to be observed was produced by a BIB (Broad Ion Beam) method. The measurement was conducted using an FE-SEM device (S-4800 from Hitachi High-Technologies Corporation) in the condition of the acceleration voltage of 4 kV. The results are shown in FIGS. 12A and 12B. As shown in FIGS. 12A and 12B, in Example 1, it was confirmed that F elements were spread from the coating layer towards the aluminum oxide layer and the current collecting layer (Al foil). On the other hand, in Reference Example 4, the spread of F elements was not confirmed. Also, a line analysis was conducted for the cathode current collector produced in Example 1 along the thickness direction. The result is shown in FIG. 13. As shown in FIG. 13, it was confirmed that F elements were localized in the aluminum oxide layer. Also, the maximum value of the strength of the F element in the aluminum oxide layer was 2 times or more of the average value of the strength of the F elements inside the coating layer. In other words, from the results of Example 1 and Reference Example 4, it was confirmed that the adhesive force was improved in the electrode current collector having the current collecting layer, the aluminum oxide layer, and the coating layer containing the conductive material, the resin, and the inorganic filler, in this order, since the Al—F bond was present in the aluminum oxide layer.

REFERENCE SIGNS LIST 1 current collecting layer
2 aluminum oxide layer
3 coating layer
10 electrode current collector
11 cathode active material layer
12 anode active material layer
13 solid electrolyte layer
14 cathode current collector
15 anode current collector
100 all solid state battery
110 nail

What is claimed is:

1. An electrode current collector to be used in an all solid state battery, the electrode current collector comprising in the following layer order:
   a current collecting layer, an aluminum oxide layer, and a coating layer containing a conductive material, a resin, and an inorganic filler; and
   an Al—F bond is present in the aluminum oxide layer, wherein F elements are present inside the coating layer, and the F element has a strength whose maximum value in the aluminum oxide layer is 2 times or more of an average value of the strength of the F elements inside the coating layer.

2. The electrode current collector according to claim 1, wherein the resin contains a fluorine element.

3. The electrode current collector according to claim 1, wherein a thickness of the aluminum oxide layer is in a range of 10 nm to 1000 nm.

4. The electrode current collector according to claim 1, wherein the current collecting layer contains an Al element.

5. The electrode current collector according to claim 1, wherein aluminum oxide layer has surface roughness Ra of 20 nm or more and 200 nm or less.

6. The electrode current collector according to claim 1, wherein
   the aluminum oxide layer includes an opening, and
   the current collecting layer and the coating layer contact with each other in the opening.

7. The electrode current collector according to claim 1, which is obtained by a method comprising:
   a preparing step of preparing a precursor member including a current collecting layer and an aluminum oxide layer; and
   a coating layer forming step of forming a coating layer by pasting a composition containing a conductive material, a resin, and an inorganic filler, as well as a fluorine element, on a surface of the aluminum oxide layer side of the precursor member, and followed by conducting a heat treatment; wherein
   an Al—F bond is formed in the aluminum oxide layer by the heat treatment in the coating layer forming step.

8. The electrode current collector according to claim 1, wherein a ratio $T_C/T_A$ of the thickness of the coating layer $T_C$ to the thickness of the aluminum oxide layer $T_A$ is 6 to 300.

9. The electrode current collector according to claim 8, wherein the ratio $T_C/T_A$ is 10 to 200.

10. An all solid state battery comprising in the following order:
    a cathode current collector, a cathode active material layer, a solid electrolyte layer, an anode active material layer, and an anode current collector, wherein
    at least one of the cathode current collector and the anode current collector is the electrode current collector according to claim 1.

11. A method for producing an electrode current collector to be used in an all solid state battery according to claim 1, the method comprising:

a preparing step of preparing a precursor member including a current collecting layer and an aluminum oxide layer; and a coating layer forming step of forming a coating layer by pasting a composition containing a conductive material, a resin, and an inorganic filler, as well as a fluorine element, on a surface of the aluminum oxide layer side of the precursor member, and followed by conducting a heat treatment; wherein an Al—F bond is formed in the aluminum oxide layer by the heat treatment in the coating layer forming step.

12. The method for producing an electrode current collector according to claim 11, wherein a temperature for the heat treatment in the coating layer forming step is 85° C. or more.

* * * * *